(12) United States Patent
Cazuc et al.

(10) Patent No.: US 12,049,853 B2
(45) Date of Patent: Jul. 30, 2024

(54) THRUST REVERSER FOR AN AIRCRAFT BYPASS TURBOJET ENGINE NACELLE

(71) Applicant: SAFRAN NACELLES, Gonfreville-l'Orcher (FR)

(72) Inventors: Xavier Cazuc, Moissy-Cramayel (FR); Jean-Philippe Joret, Moissy-Cramayel (FR); Vincent Jean-François Peyron, Moissy-Cramayel (FR); Sébastien Laurent Marie Pascal, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 17/999,106

(22) PCT Filed: May 17, 2021

(86) PCT No.: PCT/FR2021/050846
§ 371 (c)(1),
(2) Date: Nov. 17, 2022

(87) PCT Pub. No.: WO2021/234254
PCT Pub. Date: Nov. 25, 2021

(65) Prior Publication Data
US 2023/0184195 A1 Jun. 15, 2023

(30) Foreign Application Priority Data
May 20, 2020 (FR) ........................................ 2005254

(51) Int. Cl.
*F02K 1/72* (2006.01)
*F02K 3/06* (2006.01)
(52) U.S. Cl.
CPC . *F02K 1/72* (2013.01); *F02K 3/06* (2013.01)

(58) Field of Classification Search
CPC ... F02K 1/72; F02K 1/09; F02K 1/763; F02K 1/625; F02K 3/06
See application file for complete search history.

(56) References Cited

U.S. PATENT DOCUMENTS 3,059,426 A * 10/1962 Laucher .................. F02K 1/625
239/265.31
3,779,010 A * 12/1973 Chamay .................... F02K 1/72
239/265.31
(Continued)

FOREIGN PATENT DOCUMENTS

EP 1843031 A1 * 10/2007 ............... F02K 1/72
EP 3339619 A1 * 6/2018 ............. B64D 29/06
(Continued)

OTHER PUBLICATIONS

International Search Report mailed Jul. 22, 2021, issued in corresponding International Application No. PCT/FR2021/050846, filed May 17, 2021, 5 pages.
(Continued)

*Primary Examiner* — Craig Kim
(74) *Attorney, Agent, or Firm* — CHRISTENSEN O'CONNOR JOHNSON KINDNESS PLLC (57) ABSTRACT

A thrust reverser for an aircraft bypass turbojet engine nacelle has a generally annular shape around an axis and includes an annular frame for securing deflection grids. The frame has a first frusto-conical wall widening in the downstream direction and including an upstream peripheral edge configured to be attached to a casing of the turbojet engine. A downstream peripheral edge of the wall extends in the continuation of the wall and secures the upstream ends of the grids. A second annular wall extends radially outwards from an outer frusto-conical face of the first wall. The first and
(Continued)

second walls are integrally formed and the second wall has axial openings through which actuators pass.

12 Claims, 7 Drawing Sheets

(56) References Cited

U.S. PATENT DOCUMENTS

| | | | | |
|---|---|---|---|---|
| 4,030,291 | A * | 6/1977 | Sargisson | F02K 1/70 239/265.29 |
| 4,998,409 | A * | 3/1991 | Mutch | F02K 1/72 239/265.29 |
| 5,228,641 | A * | 7/1993 | Remlaoui | F02K 1/72 244/110 B |
| 5,309,711 | A * | 5/1994 | Matthias | F02K 1/72 239/265.29 |
| 5,778,659 | A * | 7/1998 | Duesler | F02K 1/09 244/110 B |
| 5,806,302 | A | 9/1998 | Cariola et al. | |
| 5,927,647 | A * | 7/1999 | Masters | F02K 1/72 244/110 B |
| 6,546,715 | B1 * | 4/2003 | Blevins | F02K 1/72 239/265.29 |
| 7,559,507 | B2 * | 7/2009 | Harrison | F02K 1/766 60/228 |
| 7,600,371 | B2 * | 10/2009 | Sternberger | F02K 1/62 244/110 B |
| 8,109,466 | B2 * | 2/2012 | Aten | F02K 1/625 244/110 B |
| 8,316,632 | B2 * | 11/2012 | West | F02K 1/766 60/226.2 |
| 8,713,911 | B2 * | 5/2014 | Kopecek | F02K 1/766 60/226.3 |
| 8,869,507 | B2 * | 10/2014 | Cloft | F02K 1/68 60/226.3 |
| 9,086,034 | B2 * | 7/2015 | Aten | F02K 1/72 |
| 11,022,071 | B2 * | 6/2021 | Torjesen | F02K 1/72 |
| 11,499,502 | B2 * | 11/2022 | Marshall | F02K 1/42 |
| 11,499,503 | B1 * | 11/2022 | Alstad | F02K 1/563 |
| 2003/0024236 | A1 * | 2/2003 | Lymons | F02K 1/766 60/226.2 |
| 2006/0005530 | A1 * | 1/2006 | Blin | F02K 1/72 60/226.2 |
| 2007/0007388 | A1 * | 1/2007 | Harrison | F02K 1/72 244/110 B |
| 2009/0151320 | A1 * | 6/2009 | Sternberger | F02K 1/72 60/226.2 |
| 2009/0301056 | A1 * | 12/2009 | Hatrick | F02K 1/72 60/226.2 |
| 2013/0126638 | A1 * | 5/2013 | Vauchel | F02K 1/805 239/265.19 |
| 2015/0285185 | A1 | 10/2015 | Caruel | |
| 2016/0273489 | A1 | 9/2016 | Bunel et al. | |
| 2018/0216572 | A1 * | 8/2018 | Kopecek | F02K 1/60 |
| 2020/0277916 | A1 * | 9/2020 | Caruel | F02K 1/766 |
| 2021/0070419 | A1 * | 3/2021 | Decker | B64C 3/18 |
| 2023/0011741 | A1 * | 1/2023 | Tatekawa | B60K 6/445 |
| 2023/0059782 | A1 * | 2/2023 | Cazuc | F02K 1/72 |
| 2023/0088298 | A1 * | 3/2023 | Cazuc | F02K 1/72 |
| 2023/0107797 | A1 * | 4/2023 | Frish | G01N 33/0047 73/31.05 |

FOREIGN PATENT DOCUMENTS

| | | |
|---|---|---|
| FR | 2 981 989 A1 | 5/2013 |
| WO | 2014044964 A1 | 3/2014 |

OTHER PUBLICATIONS

Written Opinion mailed Jul. 22, 2021, issued in corresponding International Application No. PCT/FR2021/050846, filed May 17, 2021, 5 pages.
English translation of Written Opinion mailed Jul. 22, 2021, issued in corresponding International Application No. PCT/FR2021/050846, filed May 17, 2021, 6 pages.
International Preliminary Report on Patentability mailed Nov. 17, 2022, issued in corresponding International Application No. PCT/FR2021/050846, filed May 17, 2021, 6 pages.

* cited by examiner

THRUST REVERSER FOR AN AIRCRAFT BYPASS TURBOJET ENGINE NACELLE

FIELD OF THE DISCLOSURE

The disclosure relates to the field of aircraft bypass turbojet engine nacelles, and in particular to the thrust reversers fitted to these nacelles.

BACKGROUND

The prior art comprises the document U.S. Pat. No. 4,998,409 A.

The thrust reversers are nowadays widely used in the aircraft nacelles and, in particular, in the nacelles accommodating a bypass turbojet engine. In a known way, such a turbojet generates, through the blades of a rotating fan, a hot air flux (called primary flux) coming from a combustion chamber, and a cold air flux (called secondary flux) which circulates outside the turbojet through an annular channel, formed between a fairing of the turbojet and an internal wall of the nacelle. The two air fluxes are then ejected from the turbojet engine through the rear of the nacelle, thus generating thrust.

In such a configuration, the role of a thrust reverser is, during a landing phase of the aircraft, to improve its ground-breaking capacity by redirecting forward at least part of the thrust generated by the turbojet engine. In particular, when the thrust reverser is in action, it obstructs the annular channel of the cold air flow (i.e., the secondary flux) and directs this flux towards the front of the nacelle, thereby generating a counter-thrust.

The means used to achieve this redirection of the cold air flow vary according to the type of reverser. However, in all cases, the structure of a thrust reverser comprises movable cowls that can be moved between, on the one hand, a deployed position (also known as the reverse thrust position) in which they open a passage in the nacelle for the deflected flux, and, on the other hand, a retracted position (also known as the direct jet position) in which they close this passage. In this way, the cowls can fulfil a function of activating other deflection means such as flaps. In this case, the flaps, activated by the movement of the movable cowls, obstruct, at least in part, the channel in which the secondary flux circulates.

In addition, in the case of a thrust reverser with deflection grids, the air flow is then redirected by deflection grids.

Figure 1:
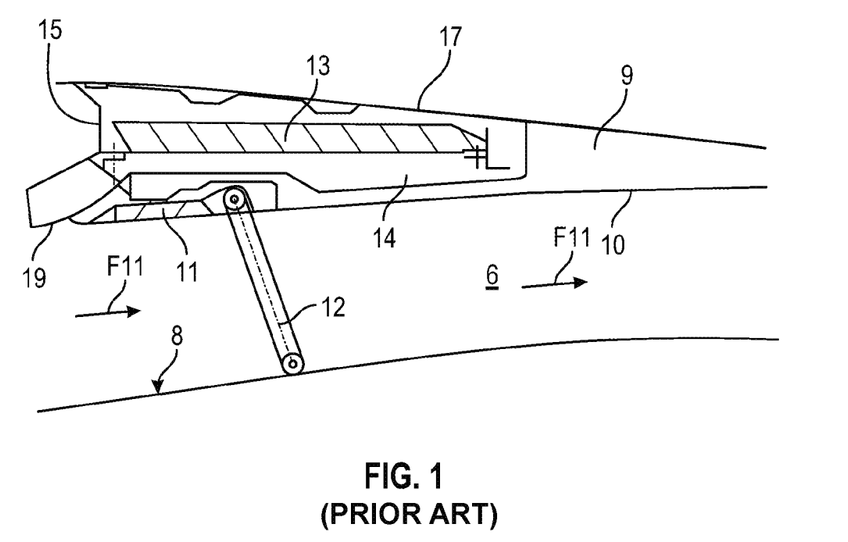
FIG. 1 is a partial schematic view, in longitudinal section, of a thrust reverser according to the prior art in the direct jet position.
Figure 2:
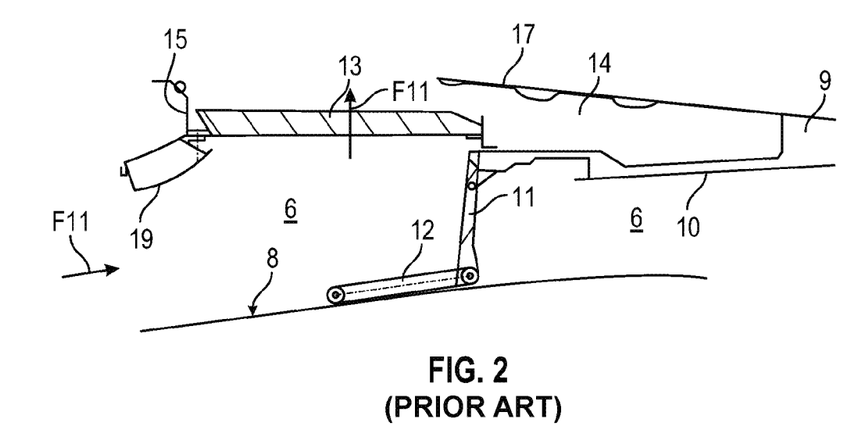
FIG. 2 is a partial schematic view, in longitudinal section, of the thrust reverser of FIG. 1 in the reverse thrust position.

A reverser of the prior art is shown in FIGS. 1 and 2. This reverser is of the grid reverser or cascade reverser type.

This type of reverser comprises at least one mobile cowl 9 in relation to a fixed part comprising an upstream annular frame 15, the cowl 9 having an external wall 17 and an internal wall 10 intended to delimit, in a direct jet position of the turbojet engine (FIG. 1), an external wall of the annular channel 6 in which the secondary flux F11 flows. The reverser also comprises at least one flap 11 mounted in an articulated manner on the mobile cowl 9 and actuated by at least one connecting rod 12 when the mobile cowl is moved downstream, so that, in a thrust reversal position (FIG. 2), each flap 11 comprises a zone extending into the annular channel 6 so as to deflect at least part of the secondary flux F11 out of the annular channel 6.

In the case of this type of reverser, the reorientation of the secondary flux F11 is carried out by deflection grids 13, the mobile cowl 9 having only a simple sliding function aimed at uncovering or covering these grids 13, the translation of the mobile cowl 9 being carried out along a longitudinal axis substantially parallel to the axis of the nacelle 1 and the reverser.

A housing 14 is provided in the cowl 10 to accommodate the grids 13 when the reverser is not activated, i.e., in the direct jet position, as shown in FIG. 1.

The grids 13 are arranged adjacent to each other in an annular area surrounding the annular channel 6, the grids 13 being arranged edge to edge so that there is no gap between them. In this way, the entire secondary flux F11 deflected by the flaps 10 passes through the grids 13. The means for moving and guiding the mobile cowls 9 (not shown) are located under the grids 13.

An annular deflection fairing 19, commonly called a deflection edge, covers the internal periphery of the frame 15. This fairing 19 has a rounded cross-sectional shape and extends from the external periphery of the annular channel 6 to the upstream end of the grids 13.

For reasons of efficiency, the fairing 19 must have a large radius of curvature. In addition, in order to increase the length of the grids 13 as much as possible so as to deflect the secondary flux F11 upstream as much as possible, it is necessary to arrange the grids 13 as close as possible to the external wall 17 of the cowl 9. The limited length of the housing of the cowl and the large radius of the fairing 19 reduce the length of the grids 13.

In order to overcome this disadvantage, it is known to arrange the grids 13 obliquely. The grids as a whole then extend in the manner of a truncated cone around the annular channel 6.

The document EP-A1-1 229 237 describes such a reverser, in which the grids are arranged obliquely. In this case, however, it is no longer possible to arrange the means for moving and guiding the mobile cowl under the grids. The grids are then spaced apart from each other so that the aforementioned moving and guiding means are arranged between two adjacent grids.

In this case, part of the secondary flux can escape into the gap between the grids, which has the effect of reducing the deflection of the secondary flux and thus the efficiency of the reverser.

In addition, the frame 15 of a thrust reverser is a structural part that has several functions and can be complex and expensive to build. The frame 15 secures and holds the grids 13 at their upstream ends. The frame 15 holds the fairing 19 which limits disturbances in the flow of air through the grids 13. Finally, the frame 15 may be used to support the movement means (not shown) of the cowls 9 and must therefore withstand relatively high forces.

A thrust reverser frame 15 is generally formed by the assembly of several parts and in particular several sheets.

Figure 3:
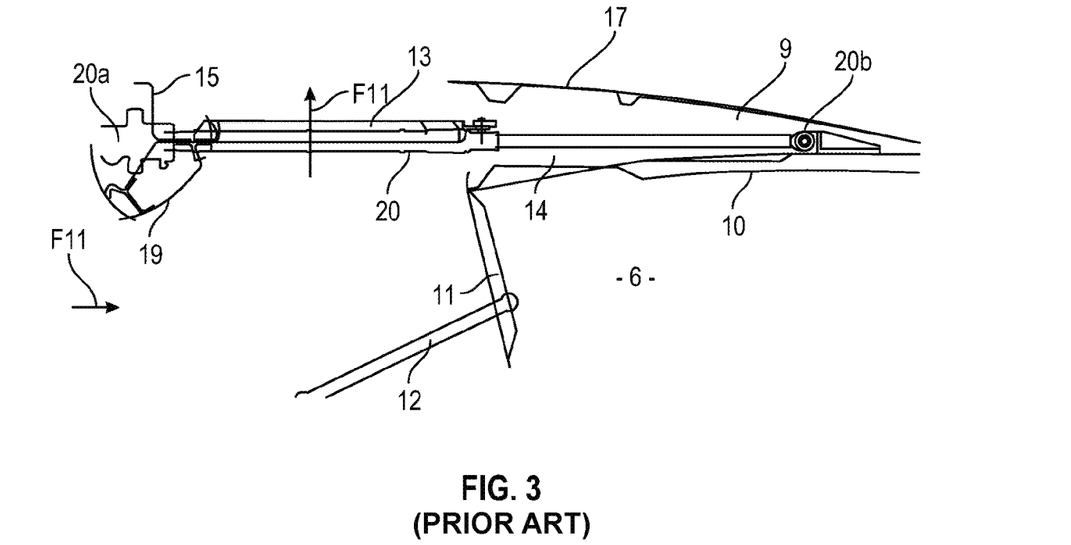
FIG. 3 is a partial schematic view, in longitudinal section, of another thrust reverser according to the prior art in the reverse thrust position.
Figure 4:
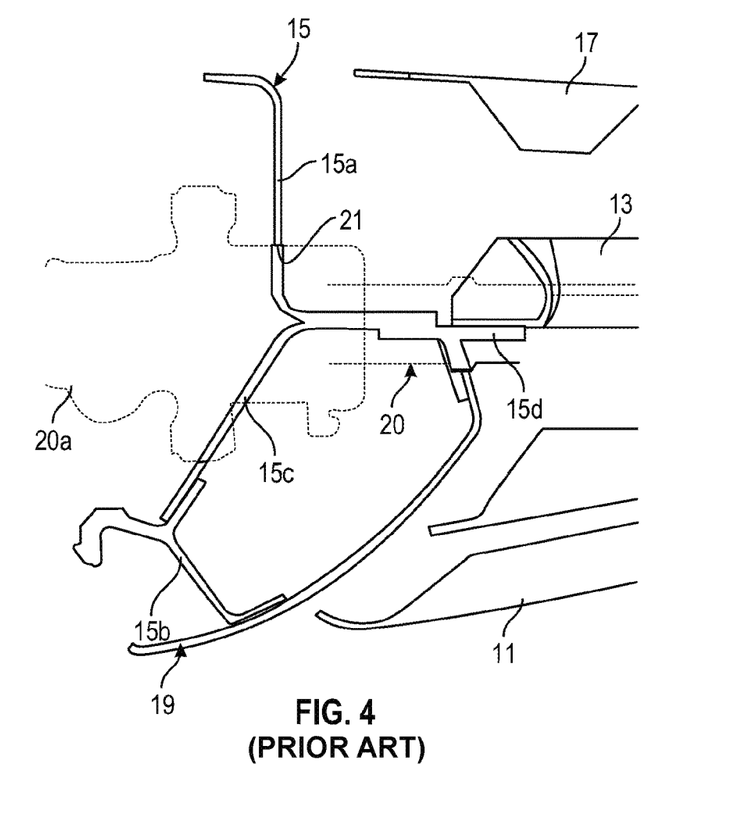
FIG. 4 is a larger scale view of part of the thrust reverser of FIG. 3.

FIGS. 3 and 4 illustrate another thrust reverser of the prior art and show the position of one of the means of moving the cowls 9 between their two aforementioned positions, these means of movement being in the form of an actuator 20.

The actuator 20 is elongate in shape and extends parallel to the longitudinal axis of the nacelle and thrust reverser. It has an upstream end 20a secured to the fixed part comprising the frame 15, and a downstream end 20b which is secured to the cowls 9. As can be seen more clearly in FIG. 4, the frame 15 is formed by assembling a number of parts 15a, 15b, 15c, 15d, etc., and a large opening 21 is formed axially through the frame 15 to allow the actuator 20 to be mounted. This opening 21 extends over several of the parts as well as in their joining areas, which weakens the frame 15 and may require it to be oversized, and in particular to be lengthened along the axis or thickened in the radial direction, to ensure that the grids 13 are held in position.

In particular, the disclosure proposes an improvement to the existing technology which allows to simplify the design and in particular the manufacture of the thrust reverser frame.

SUMMARY

The present disclosure proposes a thrust reverser for a nacelle of an aircraft bypass turbojet engine, this thrust reverser having a general annular shape around an axis and comprising:
- a fixed upstream part comprising an annular frame,
- a downstream annular support,
- deflection grids, the upstream ends of which are secured to the frame and the downstream ends of which are secured to the support,
- cowls that can be moved in translation from an upstream position in which they cover the grids to a thrust reversal downstream position in which the grids are uncovered,
- elements for deflecting a secondary flux of the turbojet engine through the grids when the cowls are in their downstream position, and
- actuators of elongated shape, the upstream ends of which are secured to the fixed part and the downstream ends of which are secured to the cowls, characterised in that the frame comprises:
- a first frustoconical wall widening in the downstream direction and comprising an upstream peripheral edge configured to be secured to a casing of the turbojet engine, and a downstream peripheral edge extending in the continuation of the wall and being used to secure the upstream ends of the grids, and
- a second annular wall extending radially outwards from an external frustoconical face of the first wall, the first and second walls being integrally formed and the second wall comprising axial orifices through which the actuators pass.

The disclosure is advantageous in that the thrust reverser frame is formed in a single piece and is therefore monobloc. This simplifies its design and manufacture, preferably by machining a block of material for example in the form of a plate. Furthermore, the actuators pass through orifices formed in only one of the walls of the frame, which simplifies assembly and has little effect on the mechanical strength of the frame. In addition, the first wall of the frame has a frustoconical shape, the downstream edge of which is configured to be secured directly to the upstream ends of the grids, which is particularly advantageous when these grids are inclined with respect to the axis of the reverser and extend substantially in the continuation of this wall.

The reverser according to the disclosure may comprise one or more of the following features, taken in isolation from each other or in combination with each other:
- the actuators extend parallel to the axis;
- each of the grids extend in a plane which is inclined at an angle comprised between 5° and 20° with respect to the axis; and
- the actuators each extend between two adjacent grids and each traverse the planes of those grids;
- the actuators have their downstream ends remotely surrounded by the support;
- the second wall has an upstream face with first recesses and a downstream face with second recesses, the orifices being formed at the bottom of the first recesses;
- at least two partitions parallel to each other and to the axis extend into each of the first recesses, these partitions being connected to the bottom of the recess and being arranged on either side of the orifice;
- the actuators are secured to the partitions;
- the second recesses are formed by a multitude of cavities defined by first annular webs and second radial webs;
- the frame comprises a third annular wall which extends radially inwards from an internal frustoconical face of the first wall, stiffening ribs extending radially between this internal frustoconical face and a downstream annular face of this third wall;
- an annular deflection fairing bears on and is secured on an internal periphery of the third wall and on a downstream end of the internal frustoconical face;

The present disclosure also relates to a bypass turbojet engine for an aircraft, comprising a thrust reverser as described above.

DESCRIPTION OF THE DRAWINGS

The present disclosure will be better understood and further details, features and advantages of the present disclosure will become clearer from the following non-limiting example description, with reference to the attached drawings in which.

DETAILED DESCRIPTION

Reference is now made to FIGS. 5 to 12 which illustrate a preferred embodiment of a thrust reverser 30 according to the disclosure for an aircraft turbojet engine nacelle.

The thrust reverser 30 has a generally annular shape about an axis (not visible) which is the longitudinal axis of the turbojet engine and its nacelle. The thrust reverser 30 comprises:
- a fixed upstream part 32 comprising an annular frame 34,
- a downstream annular support 36, deflection grids 38, the upstream ends of which 38*a* are secured to the frame 34 and the downstream ends of which 38*b* are secured to the support 36, cowls 40 which can be moved in translation from an upstream position shown in FIG. 5, in which they cover and enclose the grids 38, to a thrust reversal downstream position shown in FIG. 6, in which the grids 38 are uncovered and therefore free, elements 42 for deflecting the secondary flux F11 of the turbojet engine through the grids 38 when the cowls 40 are in their downstream position, and actuators 44 of elongated shape, the upstream ends 44*a* of which are secured to the fixed part 32 and the downstream ends 44*b* are secured to the cowls 40.

Figure 5:
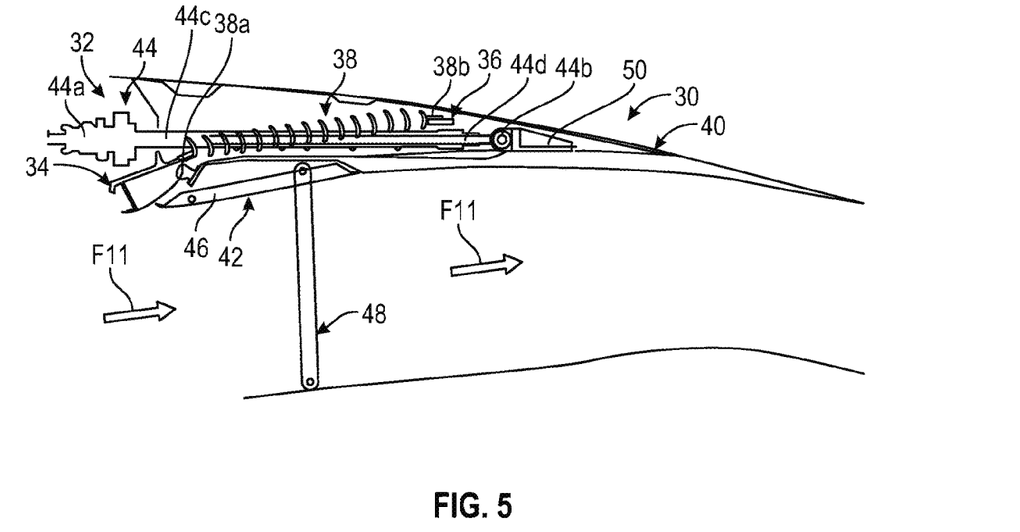
FIG. 5 is a partial schematic view, in longitudinal section, of a thrust reverser according to one embodiment of the disclosure in the direct jet position.
Figure 6:
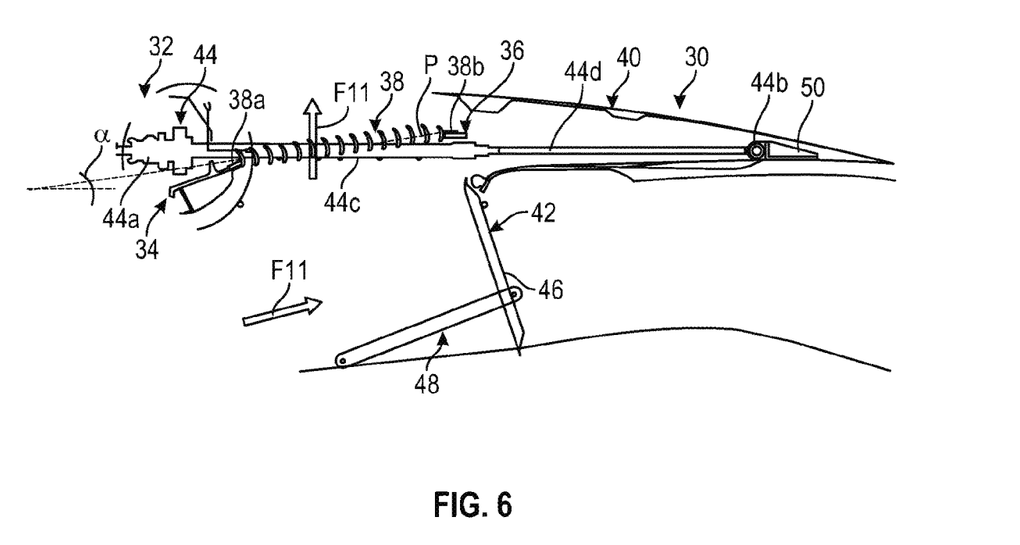
FIG. 6 is a partial schematic view, in longitudinal section, of the thrust reverser of FIG. 5 in the reverse thrust position.

The deflection elements 42 may comprise flaps 46 associated with connecting rods 48, as in the prior art.

The cowls 40 may be similar to those of the prior art and will not be further described.

The actuators 44 are preferably cylinders. There are, for example, two or more of them, evenly distributed around the axis of the reverser. Each reverser 44 comprises a fixed body 44*c* and a movable rod 44*c*. In the example shown, the body 44*c* is secured to the fixed part 32 and the rod 44*d* is secured to the cowl(s) 40. It is therefore understood that it is the upstream end 44*a* of the body 44*c* that is secured to the fixed part 32, and the downstream end 44*b* of the rod 44*c* is secured to the cowl(s).

The attachment of the rod 44*d* to the cowl(s) 40 is achieved here by a clevis 50 added and secured to the cowl(s) 40. The attachment of the body 44*c* will be described in more detail in the following.

The deflection grids 38 are similar to those of the previous technique except that, in the example shown, they each extend in a plane P which is inclined at an angle α of between 5° and 20° with respect to the axis of the reverser (FIG. 6).

Figure 9:
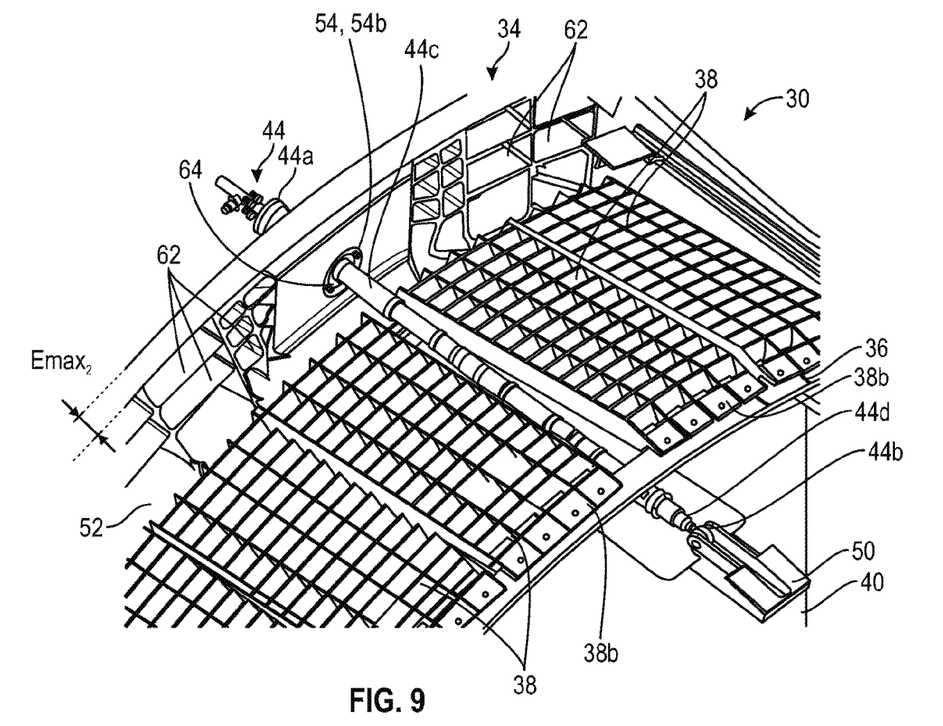
FIG. 9 is a partial schematic perspective view of the thrust reverser of FIG. 5, viewed from downstream.
Figure 10:
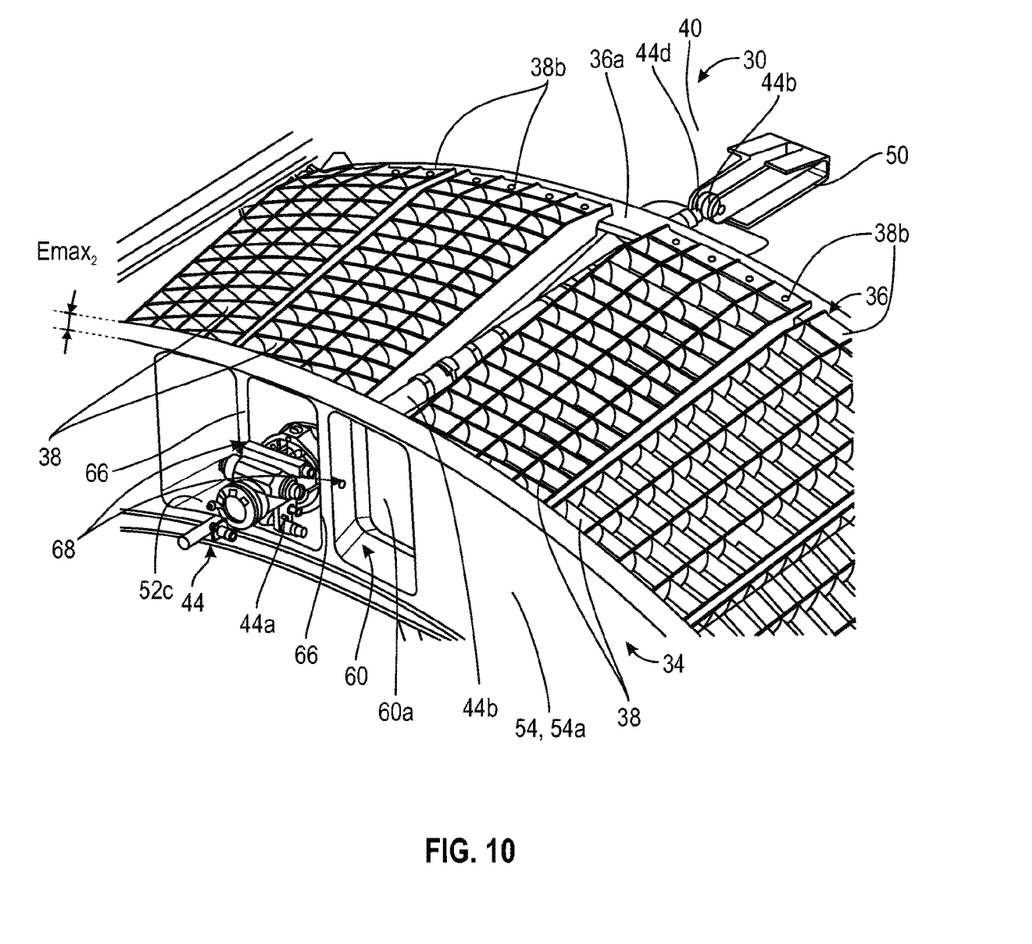
FIG. 10 is a partial schematic perspective view of the thrust reverser of FIG. 5, viewed from upstream.

It can be seen that the planes P of the grids 38 are traversed by the actuators 44. As can be seen in FIGS. 9 and 10 in particular, each of the actuators 44 passes between the facing longitudinal edges of two adjacent grids 38. The grids 38, arranged on either side of an actuator 44, are therefore circumferentially spaced apart to provide a passage for the actuator. The adjacent grids 38 which are not arranged on either side of an actuator are instead arranged circumferentially edge to edge.

The support 36 preferably extends continuously through 360° around the axis of the reverser 30. It is formed by a ring in the example shown.

The downstream ends 38*b* of the grids 38 are applied to an external annular face 36*a* of the support 36 and are secured to the support by welding or by securing means of the screw-nut type for example (FIG. 10).

It can be seen that the support 36 extends around the actuators 44. FIGS. 5 and 6 show that the actuators 44 are located at a certain distance from this support 38.

Figure 7:
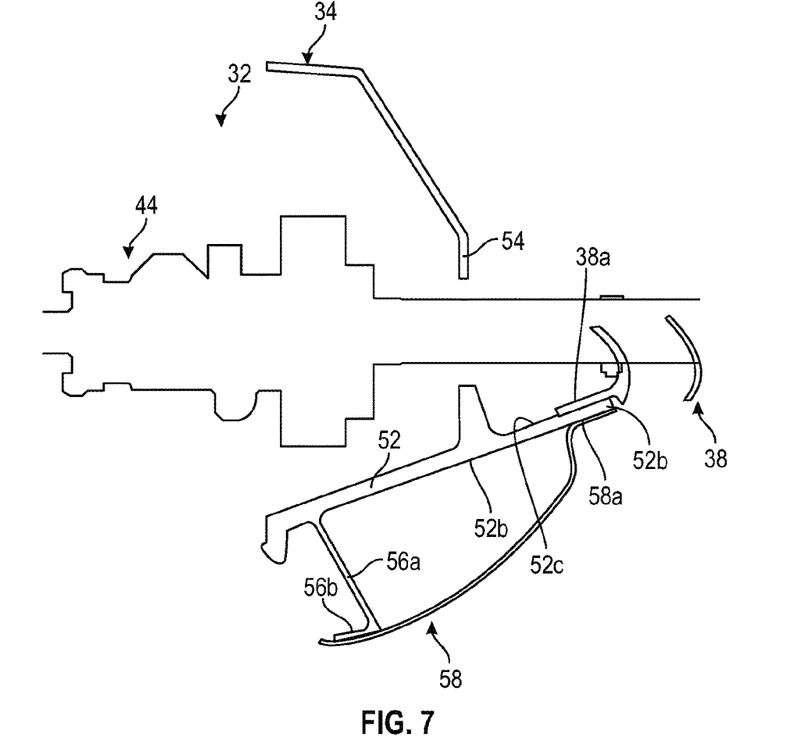
FIG. 7 is a larger scale view of part of the thrust reverser of FIG. 5.

The upstream ends 38*a* of the grids 38 are applied to an external frustoconical face 52*c* of the frame 34 and are secured to this frame by welding or by securing means of the screw-nut type for example (FIG. 7).

The frame 34 is only visible in axial section in FIG. 8 and in perspective in the following figures.

The frame 34 comprises:

a first frustoconical wall 52 widening in the downstream direction and comprising an upstream peripheral edge 52*a* and a downstream peripheral edge 52*b* which extends in the continuation of the wall 52 and which comprises the aforementioned face 52*c*, and a second annular wall 54 which extends radially towards the outside from this face 52*c*.

According to one of the characteristics of the disclosure, the walls 52, 54 and even other walls of the frame 34 are integrally formed (or come as a whole of material). Indeed, one of the aims of the disclosure is to produce a one-piece frame 34 eliminating any need for assembly of parts. The frame 34 is for example made of aluminium.

The frame may be continuous over 360° or may be sectorised into two or more consecutive sectors.

In the context of the present disclosure, the frame 34 may be made by machining a block of material. The block of material may be in the form of a plate which is cut to obtain an annular shape, the internal and external diameters of which correspond to the internal diameter Dint and external diameter Dext of the frame, to within a few millimetres, for example, in order to allow finishing machining. This plate has a maximum thickness which corresponds to the maximum axial dimension Emax1 of the frame. Emax1 is for example between 150 and 250 mm, and preferably between 200 and 220 mm. This block or plate is then intended to be machined to form the walls 52, 54 and other parts of the frame which will be detailed in the following.

In the example shown, the frame 34 includes a third annular wall 56 which extends radially towards the inside from an internal frustoconical face 52*d* of the wall 52.

This wall 56 is also formed integrally with the walls 52, 54.

In the example shown, the wall 56 is generally inverted L-shaped in cross-section and comprises a radially external annular leg 56*a*, the external periphery of which is connected to face 52*d* and the internal periphery of which is connected to an annular flange 56*b* which is here oriented axially upstream. The leg 56*a* would have a generally frustoconical shape flaring from downstream to upstream.

An annular deflection fairing 58 is supported and secured on one side on the flange 56*b* and on a downstream end of the face 52*d*. The fairing 58 comprises a downstream end portion 58*a* which is planar and is applied to the face 52*d*, the remainder of the fairing being domed or curved with a concavity directed radially towards the outside and upstream.

As can be seen in FIG. 7, this downstream end portion 58*a* of the fairing 58 is located radially towards the inside of the actuators 44 and is therefore not interrupted by any passages required for those actuators.

From the same figure it can be seen that the upstream ends of the grids 38 are parallel to this downstream end portion 58*a*. This is due to the fact that the downstream edge 58*b* of the wall 52 extends in the continuation of this wall and therefore has a frustoconical shape, the internal 52*d* and external 52*c* faces of which are parallel when viewed in cross-section.

The opposite upstream edge 52*a* of the wall 52, known as the J-ring, has a specific cross-sectional shape which allows it to be secured to a turbojet engine casing, as is well known to the person skilled in the art.

Figure 8:
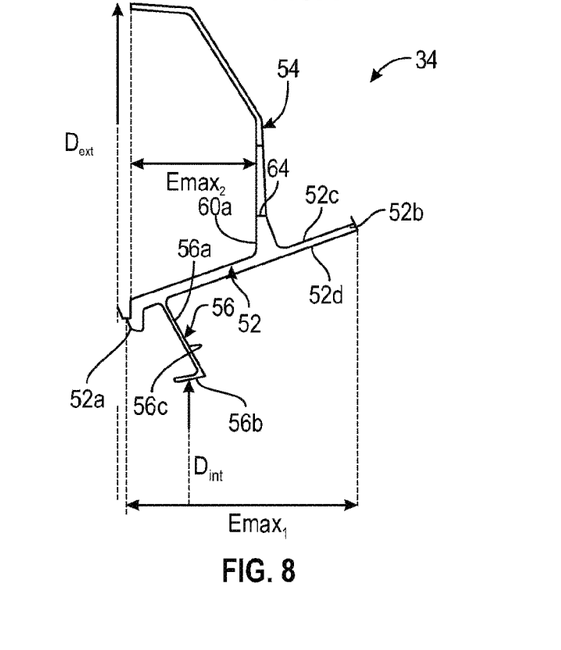
FIG. 8 is a partial schematic view, in longitudinal section, of the thrust reverser frame of FIG. 5.
Figure 11:
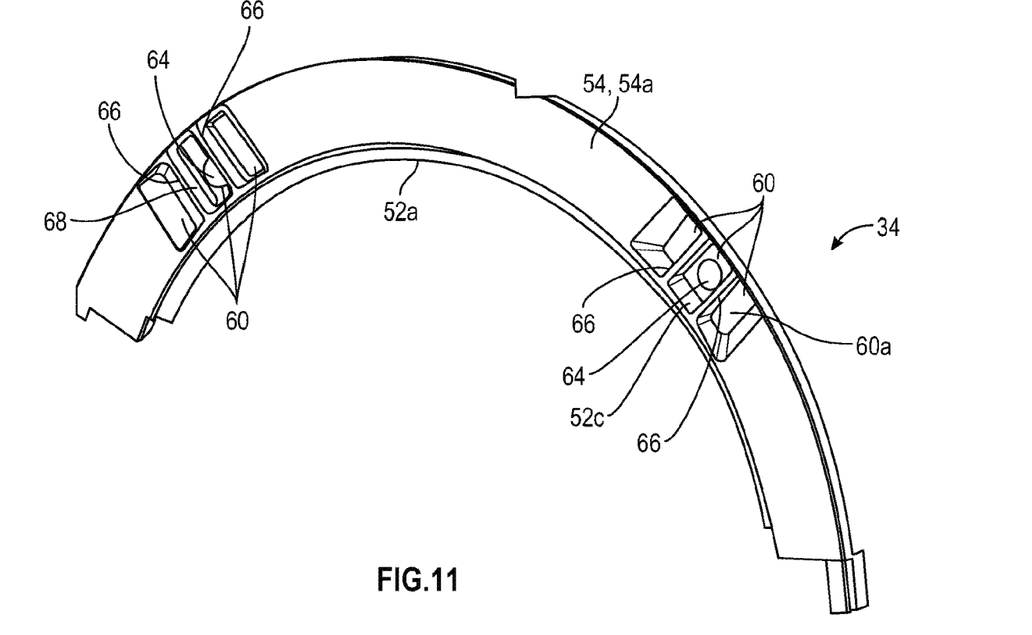
FIG. 11 is a partial schematic perspective view of the thrust reverser frame of FIG. 5, viewed from upstream.
Figure 12:
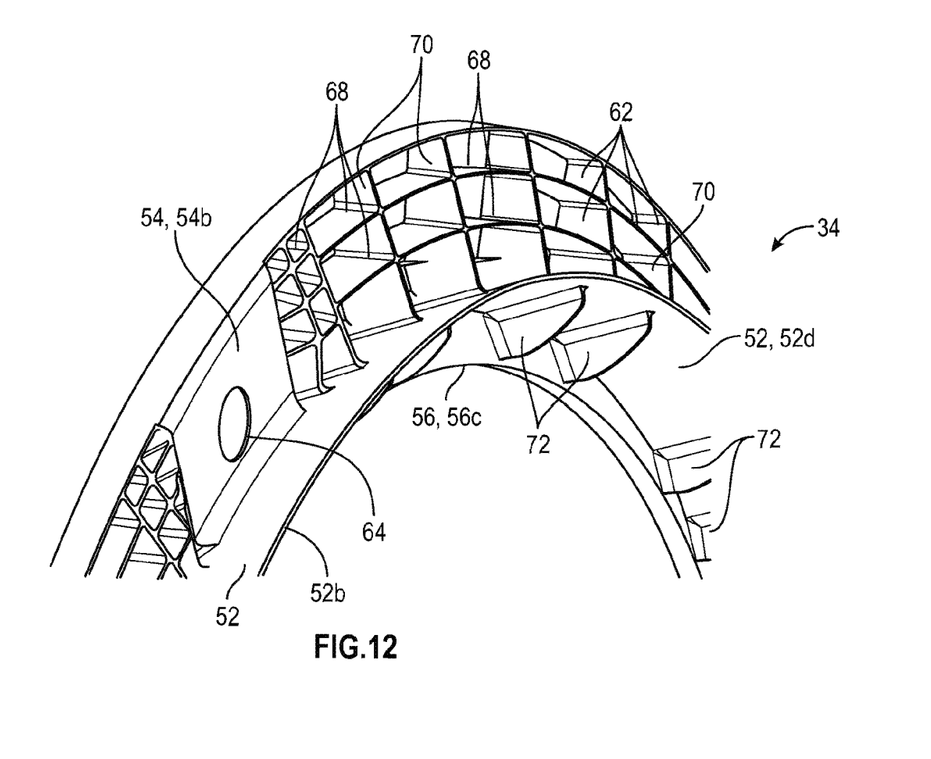
FIG. 12 is a partial schematic perspective view of the thrust reverser frame of FIG. 5, viewed from the downstream.

The wall 54 has a relatively large axial thickness Emax2 and is recessed on its two faces 54*a*, 54*b* by machining (FIGS. 8 to 10). The wall 54 thus comprises an upstream face 54*a* comprising first recesses 60 (FIGS. 10 and 11), and a downstream face 54*b* having second recesses 62 (FIGS. 9 and 12).

In the example shown, there are as many recesses 60 as there are actuators 44 because each actuator is intended to pass through an orifice 64 formed in the bottom 60*a* of a recess 60.

Each recess 60 is generally parallelepipedic in shape and is open axially upstream. In the example shown, the recess 60 is divided into three parts by two partitions 66 which are parallel to each other and to the axis of the reverser. The partitions 66 are connected to the bottom 60a of the recess 60 and are arranged on either side of the orifice 64. In the radial direction, they further extend between the face 52c and the external periphery of the wall 54.

The actuators 44 are secured to these partitions 66 which may comprise two aligned orifices 68 for receiving and securing a shaft (not shown) of the actuator 44. Each actuator 44 and in particular its end 44a or its cylinder 44c is secured to the frame 34 and more particularly to partitions 66 of the frame.

The recesses 62 enables to lighten the frame 34 while guaranteeing its mechanical strength. For this purpose, the recesses 62 of the downstream face 54b may take the form of a multitude of cavities defined by first annular webs 68 and second radial webs 70, as can be seen in FIG. 12. It can also be seen from FIG. 12 that the frame 34 includes stiffening ribs 72 which extend radially between the internal frustoconical face 52d and a downstream annular face 56c of the wall 56.

The construction of the frame 34 in a single piece brings several advantages mentioned above. In particular, it avoids the assembly of parts. It also allows several functions to be integrated into this frame, in particular securing to the casing by the edge 52a, securing to the grids by the edge 52b, passing the actuators 44 through the orifices 60 of the wall 54, securing the actuators 44 by the partitions 66, lightening and reinforcing the frame 34 by the webs 68, 70 and the ribs 72, etc.

The alignment of the grids 38 in the continuation of the frustoconical wall 52 is also advantageous because it optimises the flow of the secondary flux F11 through the grids in the reverse thrust position. It allows the upstream ends 38a of the grids 38 to be brought closer to the downstream end of the fairing 58 and therefore to guide the flux just after it leaves the fairing, thus limiting the risks of air separation on the latter. It is then possible to reduce the axial dimension of this fairing to further limit this risk of detachment.

The invention claimed is:

1. A thrust reverser for a nacelle of an aircraft bypass turbojet engine, the thrust reverser having an annular shape around an axis and comprising:
   a fixed upstream part comprising an annular frame,
   a downstream annular support,
   deflection grids, said deflection grids having upstream ends secured to said annular frame and further having downstream ends secured to said downstream annular support,
   cowls configured to be moved in translation from an upstream position in which the cowls cover the deflection grids to a downstream position in which the deflection grids are uncovered,
   elements configured to deflect a secondary flux of the turbojet engine through the deflection grids when the cowls are in the downstream position, and
   actuators of elongated shape, said actuators having upstream ends secured to the fixed upstream part and further having downstream ends secured to said cowls,
   wherein the annular frame comprises:
   a frustoconical first wall widening in a downstream direction and comprising an upstream peripheral edge configured to be secured to a casing of the turbojet engine, and a downstream frustoconical peripheral edge extending in a continuation of the frustoconical first wall and secured to the upstream ends of the deflection grids, and
   an annular second wall positioned upstream of the downstream frustoconical peripheral edge and extending radially outwards from an external frustoconical face of said frustoconical first wall,
   said frustoconical first wall and said second annular wall being integrally formed and said annular second wall comprising axial orifices through which said actuators pass.

2. The thrust reverser according to claim 1, wherein said actuators extend parallel to said axis.

3. The thrust reverser according to claim 1, wherein each of said deflection grids extends in a plane which is inclined by an angle comprised between 5° and 20° with respect to said axis.

4. The thrust reverser according to claim 2, wherein each of said actuators extends between two adjacent deflection grids and each passes through planes of said two adjacent deflection grids.

5. The thrust reverser according to claim 1, wherein said actuators have downstream ends remotely surrounded by said downstream annular support.

6. The thrust reverser according to claim 1, wherein said annular second wall has an upstream face comprising first recesses and a downstream face having second recesses, said orifices being formed at a bottom of said first recesses.

7. The thrust reverser according to claim 6, wherein at least two partitions parallel to each other and to said axis extend in each of said first recesses, the at least two partitions being connected to the bottom of the respective first recesses and being disposed on either side of said orifices.

8. The thrust reverser according to claim 7, wherein the actuators are secured to said at least two partitions.

9. The thrust reverser according to claim 6, wherein said second recesses are formed by a multitude of cavities defined by first annular webs and second radial webs.

10. The thrust reverser according to claim 1, wherein the annular frame comprises an annular third wall which extends radially inwards from an internal frustoconical face of said frustoconical first wall, stiffening ribs extending radially between the internal frustoconical face and a downstream annular face of the annular third wall.

11. The thrust reverser according to claim 10, wherein an annular deflection fairing bears on and is secured to an internal periphery of said annular third wall and on a downstream end of said internal frustoconical face.

12. A bypass turbojet engine for an aircraft, comprising a thrust reverser according to claim 1.

* * * * *